United States Patent
Garakani et al.

(10) Patent No.: US 7,113,501 B2
(45) Date of Patent: Sep. 26, 2006

(54) SYNCHRONIZATION OF V42BIS DE/COMPRESSION FOR V34/V42 MODEM RELAY METHOD AND APPARATUS

(75) Inventors: Mehryar Khalili Garakani, Los Angeles, CA (US); Nathan R. Melhorn, Chelmsford, MA (US); Marcus Prewarski, Santa Barbara, CA (US); Herbert M. Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 09/728,431

(22) Filed: Nov. 30, 2000

(65) Prior Publication Data

US 2002/0064137 A1    May 30, 2002

Related U.S. Application Data

(63) Continuation-in-part of application No. 09/715,438, filed on Nov. 16, 2000.

(51) Int. Cl.
*H04L 12/66* (2006.01)
*G01G 31/08* (2006.01)
*H04J 3/06* (2006.01)
*H04B 1/38* (2006.01)

(52) U.S. Cl. ............... 370/352; 370/350; 370/216; 370/503; 375/222

(58) Field of Classification Search ........... 370/235, 370/236, 278, 345, 346, 352–354, 401, 409, 370/503, 493, 229, 231, 400, 282, 304, 509, 370/510, 389, 350, 216; 379/90.01, 93.01, 379/93.08, 93.09, 93.28, 100.09, 92.01; 375/220, 375/222

See application file for complete search history.

(56) References Cited

U.S. PATENT DOCUMENTS

| | | | | | |
|---|---|---|---|---|---|
| 5,170,394 | A | * | 12/1992 | Biber et al. | 370/449 |
| 5,438,614 | A | * | 8/1995 | Rozman et al. | 379/93.08 |
| 5,781,726 | A | * | 7/1998 | Pereira | 709/200 |
| 6,487,196 | B1 | * | 11/2002 | Verthein et al. | 370/352 |
| 6,757,250 | B1 | * | 6/2004 | Fayad et al. | 370/235.1 |
| 6,757,367 | B1 | * | 6/2004 | Nicol | 379/90.01 |

* cited by examiner

*Primary Examiner*—Hanh Nguyen
(74) *Attorney, Agent, or Firm*—Johnson & McCollom, P.C.

(57) ABSTRACT

Method and apparatus for synchronizing two de/compression modems, e.g. V.42bis modems, in a voice frame network, the modems each being connected with a corresponding gateway to form a corresponding segment, are described. The method includes terminating the physical layer at either end of the corresponding gateways; negotiating at either gateway a physical layer and error-correcting data link layer with the corresponding modem; sending from either gateway to an associated modem in response to any poll command therefrom a not-ready message; signaling the other gateway when physical layer and error-correcting data link layer negotiations have been completed; and when each gateway has signaled the other that negotiations have been completed, halting the not-ready message-sending and sending instead a ready message to a corresponding modem, whereby synchronized compressed and decompressed data transmissions between the modems commences on a reliable transport. Preferably, thereafter, and upon occurrence of a destructive break condition or receipt at either gateway from a corresponding modem of an initiate data transfer command, such condition or receipt is relayed from a segment where it is detected to the other segment, thereby maintaining synchronization between the modems. Preferably, the messages and commands are compliant with the ITU-T V.42 protocol.

11 Claims, 3 Drawing Sheets

SYNCHRONIZATION OF V42BIS DE/COMPRESSION FOR V34/V42 MODEM RELAY METHOD AND APPARATUS

RELATED APPLICATIONS

This application is a continuation-in-part of co-pending U.S. patent application Ser. No. 09/715,438, filed Nov. 16, 2000 entitled HIGH-SPEED DIAL-UP MODEM SESSION STARTUP METHOD AND APPARATUS, subject to common ownership herewith by Cisco Technology, Inc.

BACKGROUND OF THE INVENTION

The present invention relates generally to voice frame network systems such as Voice over Internet Protocol (VoIP) systems for concurrently carrying both voice and data signals. More particularly, it concerns method and apparatus for transitioning a high-speed data channel from voice mode to modem relay mode during session startup and establishing and maintaining synchronization of end-to-end modem de/compression.

VoIP is widely deployed by Internet Service Providers (ISPs) and within large or distributed private enterprises. Because voice channels require low latency for audio continuity and understanding in human conversation, typical VoIP implementations have utilized low-latency mechanisms such as Real-time Transfer Protocol (RTP). Unfortunately, the voice mode of VoIP channels that use RTP is an unreliable transport mechanism for high-speed modem signals. High packet drop rates and frequent retrains cause undesirable deterioration of the signal when high-speed modem signals are carried over a standard VoIP channel.

SUMMARY OF THE INVENTION

Method and apparatus for synchronizing two de/compression modems, e.g. V.42bis modems, in a voice frame network, the modems each being connected with a corresponding gateway to form a corresponding segment, are described. The method includes terminating the physical layer at either end of the corresponding gateways; negotiating at either gateway physical layer parameters and an error-correcting data link layer with the corresponding modem; sending from either gateway to an associated modem in response to any poll command therefrom a not-ready message; signaling the other gateway when physical layer and error-correcting data link layer negotiations have been completed; and when each gateway has signaled the other that negotiations have been completed, halting the not-ready message-sending and sending instead a ready message to a corresponding modem, whereby synchronized compressed and decompressed data transmissions between the modems commences on a reliable transport. Preferably, thereafter, and upon occurrence of a destructive break condition or receipt at either gateway from a corresponding modem of an initiate data transfer command, such condition or receipt is relayed from a segment where it is detected to the other segment. This maintains synchronization between the modems.

DETAILED DESCRIPTION OF THE INVENTION

Figure 1:
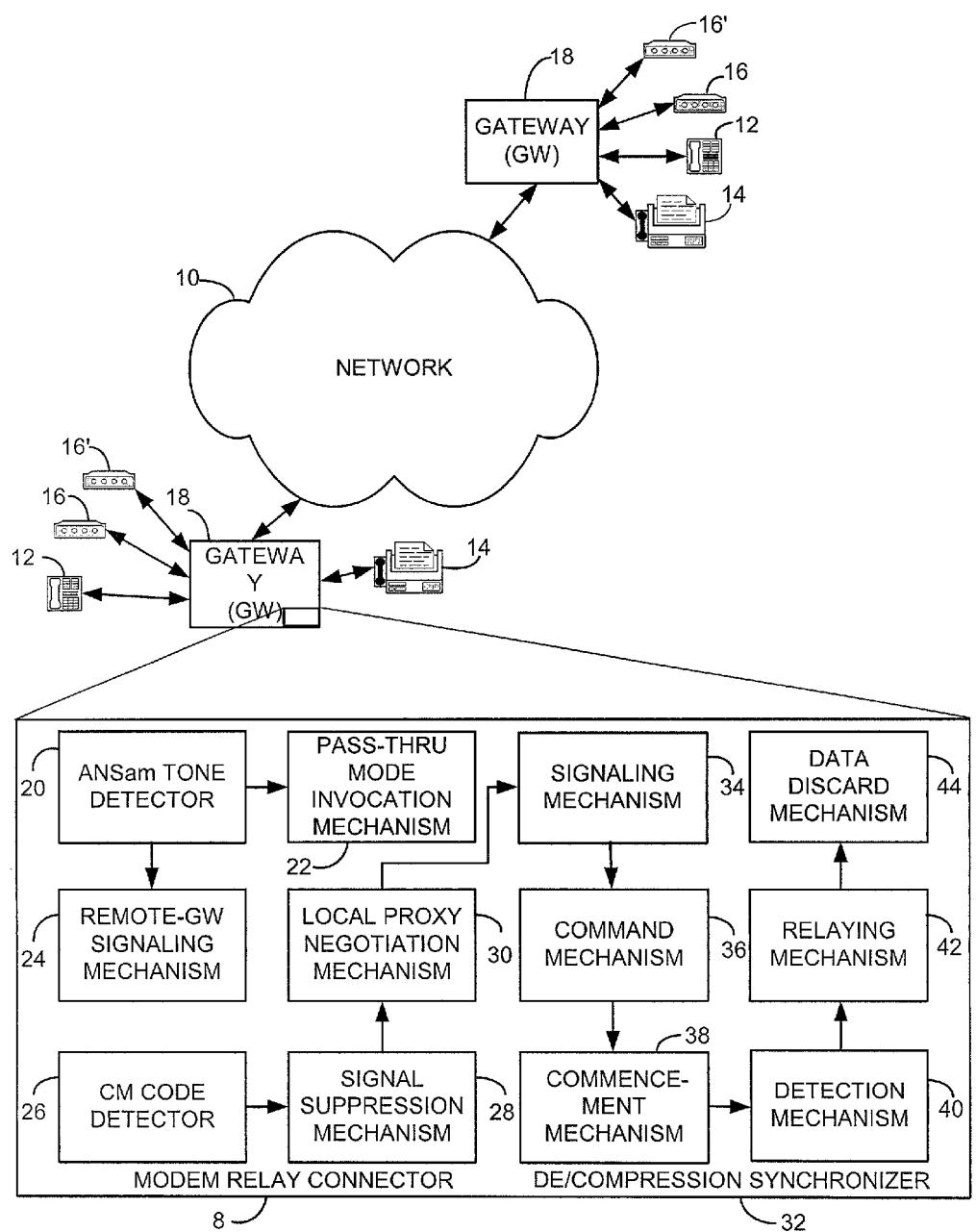
FIG. 1 is a system block diagram illustrating a VoIP network in which the high-speed dial-up modem startup apparatus is featured in accordance with a preferred embodiment of the invention.

FIG. 1 illustrates the invented apparatus 8 coupled with a network 10 operating with respect to voice traffic thereon in accordance with a voice packet protocol such as a voice over frame relay (VoFR) protocol or voice over Internet protocol (VoIP). Network 10 typically includes one or more telephone handsets 12, one or more fax machines 14 and one or more low-speed modems 16 representing different traffic demands on network 10 due to their diverse bandwidth requirements. The faxes 14 and low-speed modems 16 often share telephone numbers with the telephone handsets to provide facsimile, e-mail and Internet service to users/clients. High-speed modems 16' having data rates of 32 k–56 k bits/second (kbps) or higher are typically provided, and are the type of high-speed modems with which the invention finds particular utility.

Handsets 12 communicating voice require relatively low bit rates of only approximately 8 k–64 kbps over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, VoIP channels using RTP or other low-latency protocols represent an unreliable transport for high-speed signaling between high-speed modems 16'. Conventionally, in a VoIP network 10, high-speed modems 16' would have negotiated an end-to-end physical layer, e.g. V.34, and gateways 18 would have been passive enablers of the resulting voice mode VoIP connection which is subject to high packet drop rates and frequent retrains.

The solution to the problem described above is to terminate the physical layer, e.g. V.34, at the VoIP gateway, and to packetize and transmit the demodulated data bit stream over the IP network to the peer gateway where it is reconstructed and forwarded to the receiving modem. This is referred to as a modem relay mode of operation. By monitoring physical layer negotiation between the originating and answering endpoints during a predeterminedly early phase of the end-to-end negotiation between endpoints, it is determined whether the endpoints are modems negotiating a high-speed dial-up connection. If so, the VoIP gateways take over the end-to-end negotiation of the physical layer, terminating the physical layer locally on their adjacent telephony segment.

Modem relay startup must first determine that the originating and answering modems are high-speed modems through appropriate tone detection sensitive enough to distinguish low-speed modem 16 and fax 14 signals from high-speed modem 16' dial-up connections. It must then smoothly transition to modem relay mode at an appropriate time and in a non-disruptive manner during the sensitive end-to-end physical layer negotiation. For example, consider an enterprise with a dial-up server or machine S in a central office at location X and an employee at home who tries to make a dial-up connection from the employee's client end-station or machine C at location Y.

Assume the dial-up connection is made through a phone company P that provides the dial-up connection over a phone company P VoIP network. Such a call would have three segments:

a) Segment 1: a telephony segment from client machine C to phone company P (e.g. local loop on the client end). This will be referred to herein as the calling leg.

b) Segment 2: a VoIP segment within phone company P.

c) Segment 3: a telephony segment from phone company P to server machine S (e.g. local loop on the server end). This will be referred to herein as the called leg.

Further assume that server machine S and client machine C are connected to the dialup circuit through a high-speed V.34/V.42/V.42bis modem 16'. Also assume that initially the VoIP gateways make no special provision for the modem signals and thus carry these through just as they would with a voice channel. This means the modem signals are terminated at the physical layer (V.34), error-correcting data link layer (V.42) end-to-end by client machine C and server machine S modems. Furthermore, the V.42bix compression/decompression (hereinafter de/compression) is also terminated at client machine C and server machine S modems.

Consider now the data transfer flow from client machine C to server machine S (as an example):

a) The data stream is transferred across the data terminal equipment (DTE) interface from client machine C to its attached modem.

b) The client machine C modem transfers the bits as modulated modem signals over telephony segment 1 to phone company P's VoIP gateway.

c) The VoIP gateway associated with segment 1 performs the analogue-to-digital (A/D) conversion of the modulated modem signal and packetizes the resulting digital bit stream and transfers these packets over the IP network (i.e. segment 2) to the peer VoIP gateway associated with segment 3.

d) The VoIP gateway associated with segment 3 depacketizes the received packets (i.e. extracts the digital bit stream), and performs digital-to-analogue (D/A) conversion, which reconstructs the modulated modem signals and transmits the same on segment 3 to the server machine S modem.

e) The server machine S modem demodulates the received modulated signal and transfers the data to server machine S through its DTE interface.

A problem with this method is that reconstruction of the modem signals is not perfect. Accordingly, slight errors are introduced via A/D conversion (step c), via D/A conversion (step d), and significant errors may be introduced because of dropped IP packets that carry the modem signals from the VoIP gateway associated with client machine C to the peer gateway associated with server machine S.

The IP network does not guarantee reliable delivery (those of skill in the art will appreciate that neither does an unreliable voice transport mechanism such as RTP). This means packets can be dropped under various normal or congested network conditions. Frequent retrains and premature call termination may result.

Figure 2:
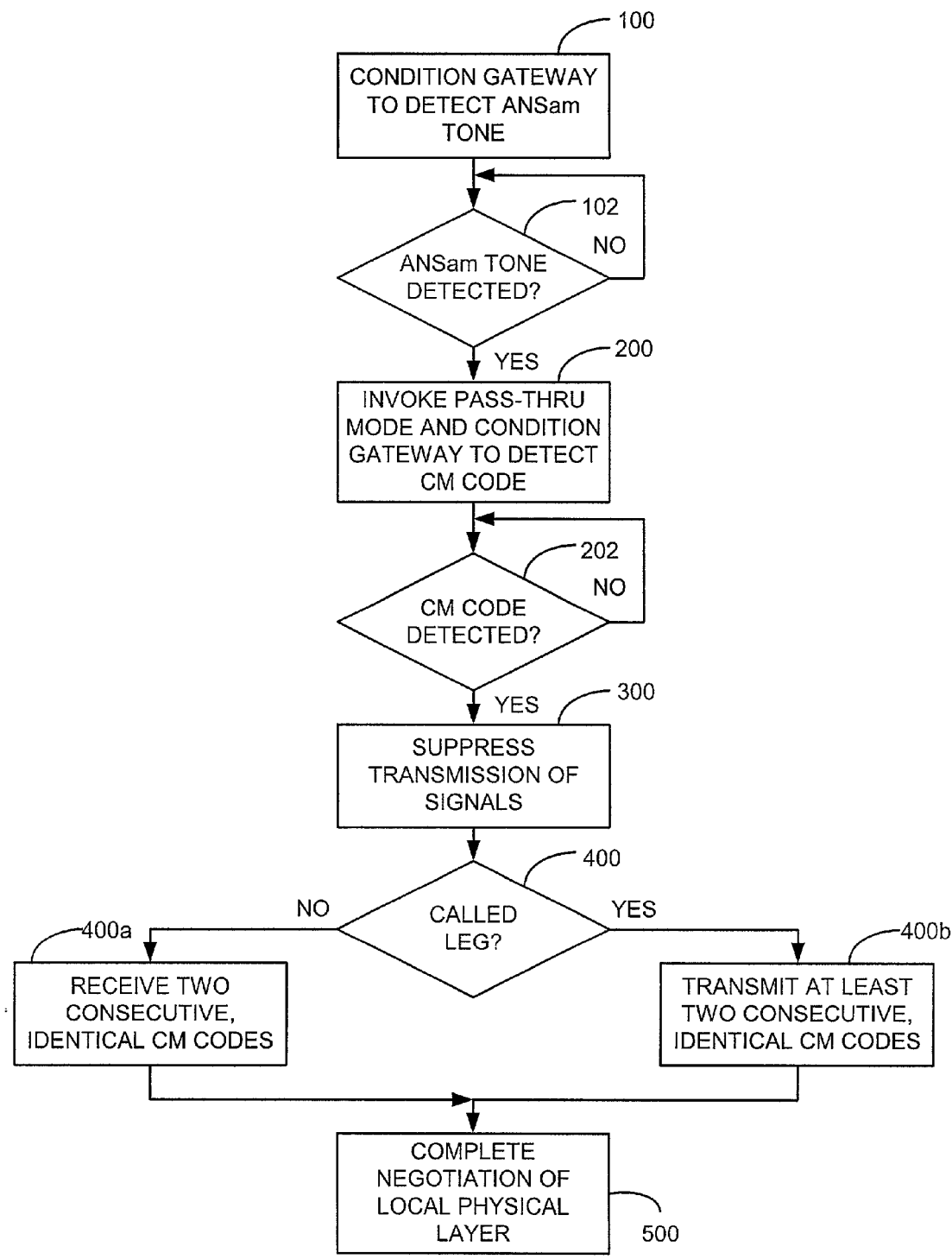
FIG. 2 is a flowchart of the voice mode-to-modem relay mode transition method in accordance with a preferred embodiment of the invention.

FIG. 2 is a flowchart illustrating the high-speed modem relay connection method in accordance with a preferred embodiment of the invention. The high-speed dial-up modem session startup method proceeds in five numbered steps as follows:

1) A VoIP gateway on the called leg is conditioned to detect an ITU-T V.8 amplitude-modulated answer tone (ANSam) signal on the stream at least from server machine S's modem to the VoIP gateway. Those of skill in the art will appreciate that detecting the ANSam signal is a strong indication that the answering modem (e.g. the server machine S modem in this example) supports high-speed dial-up connection via a V.34 or higher speed modem, e.g. V.90. The evolving ITU-T Recommendation V.8 (hereinafter the V.8 standard) is described in a February 1998 publication of the International Telecommunication Union entitled *Series V: Data Communication Over The Telephone Network* and subtitled *Procedures For Starting Sessions Of Data Transmission Over The Public Switched Telephone Network*.

In accordance with the preferred embodiment of the invention, either gateway is conditioned to detect ANSam. Occasionally, ANSam echoes back from a call-originating modem to the call-answering modem that generated the ANSam signal. Due to needed high-sensitivity in the tone detectors, ANSam then may be detected at either end. Because the earliest possible detection of ANSam is desired, in accordance with the invention, the gateways of both the called leg and the calling leg are conditioned to detect ANSam. The first gateway to detect ANSam then simply signals the other gateway that ANSam has been detected. Those of skill in the art will appreciate that such signaling may be performed in any suitable manner, e.g. via known out-of-band gateway-to-gateway signaling techniques.

Step 1 including ANSam tone detection is illustrated in FIG. 2 at 100 and 102.

2) As soon as the ANSam signal is detected, the channel is placed in a passthrough state by disabling voice compression and echo cancellation. This is accomplished preferably at both gateways, whereby the ANSam signal-detecting gateway signals the other gateway and both gateways proceed as follows. Voice compression is disabled (i.e. the channel is required to switch over to uncompressed G711 mode), assuming compression previously was enabled. (Those of skill in the art will appreciate this allows the least amount of distortion in the modem signals on the channel.) Also, voice echo cancellation is disabled, assuming it previously was enabled in voice mode. (Those of skill will appreciate that during the modem physical layer training phase, the modems configure their own echo cancellation parameters, which are used subsequently by the modems for echo cancellation.)

Next, and as part of step 2, the VoIP gateway on the calling leg is conditioned to detect a V.8 call menu (CM) signal (a digital code generated by a high-speed originating modem to indicate the fact) on the stream arriving from the originating modem on the calling leg. This is a further indication that modem relay transition is desired because it indicates that the originating modem is a high-speed modem. (Those of skill in the art will appreciate that detection of a V.8 CM signal is important in accordance with the preferred embodiment of the invention by brief consideration of the case where the originating modem is V.32 and the answering modem is V.34. In such case, ANSam would be generated on the called leg, but there would be no CM generation.)

Those of skill in the art will appreciate that, in accordance with the preferred embodiment of the invention, both gateways are conditioned to detect CM even though it is the calling leg that generates CM. It is within the spirit and scope of the invention, however, to condition only the called-leg gateway to detect CM, assuming the called-leg gateway can be identified with sufficiently high probability.

Step 2 including CM code detection is illustrated in FIG. 2 at 200 and 202.

3) Upon CM detection, the CM-detecting gateway silences or suppresses transmission of modem signals to the other leg. This is to avoid undesirable end-to-end negotiation between the two modems that would otherwise result if successive identical CMs generated by the caller modem were received by the answering modem (which under a typical protocol would respond with a V.8 joint menu (JM) signal or code). The phenomenon whereby CM undesirably reaches the far end is referred to herein as CM leakage from the calling leg to the called leg. In accordance with the invention in its preferred embodiment, CM leakage is avoided.

Step 3 is illustrated in FIG. 2 at 300.

4) After signal suppression, the VoIP gateways undertake physical layer negotiation, effectively usurping the modems' normal role and preventing the modems from completing end-to-end negotiation. Those of skill in the art will appreciate that, by this time, the originating and answering modems already are partway through V.34 Phase 1 negotiation, which was conducted end-to-end by the modems via exchange of ANSam and CM. In accordance with the invention, the V.34 stacks on the VoIP gateways accommodate for this fact as follows.

4a) On the calling leg, the VoIP gateway acts like an answering modem in Phase 1 but begins with a local truncated V.34 Phase 1 negotiation. Phase 1 negotiation is continued by the gateway at the point subsequent to generation of the ANSam signal (i.e. the gateway need not generate any additional ANSam tones). The gateway awaits two additional CMs from the originating modem (e.g. the client machine C modem, in this example). When two additional identical CMs are received, the calling-leg gateway proceeds with the rest of V.34 Phase 1 and subsequent physical layer startup as usual (i.e. as specified in the V.8 standard).

Step 4a, including determining which leg gateway 18 is in, is illustrated in FIG. 2 at 400 and 400$a$.

4b) On the called leg, the VoIP gateway acts like an originating modem in Phase 1 but begins with a local truncated V.34 Phase 1 negotiation. Phase 1 negotiation is continued by the gateway at the point subsequent to generation of CM since the answering modem (e.g. the server machine S modem, in this example) already has generated ANSam. Thus, the called-leg gateway begins generating at least two identical CMs immediately and proceeds with the rest of Phase 1 and subsequent physical layer startup as usual (i.e. as specified in the V.8 standard).

Step 4b is illustrated in FIG. 2 at 400$b$.

5) With the transition complete, local physical layer negotiation on Segment 1 (between client machine C modem and its associated VoIP gateway) and Segment 3 (between server machine S modem and its associated VoIP gateway) have supplanted the initial end-to-end negotiation between the two modems. A modem relay session thus may be established end to end in the form of a high-speed dial-up connection that is far more reliable than traditional voice mode connections within VoIP networks.

Step 5 is illustrated in FIG. 2 at 500.

In accordance with a preferred embodiment of the invention, CM signal tone detection in step 2) above may be performed as follows. The VoIP gateway demodulates the bit stream and looks for a specific bit pattern identifying modem CM. In the case of a V.8 modem, the bit pattern is 11111111110000001111 0100000111. The leading twenty bits represent the CM/JM wake-up and synchronize header. The trailing ten bits include an information octet (framed by start and stop bits) that represents the call function and V-Series modem type. The modem type should be V.34 or higher speed (e.g. V.42 or V.42bis) modem 16', in accordance with the invention.

The gateways might be enhanced to perform the modem functions (e.g. V.34, V.42 and V.42bis) by terminating V.34, V.42 and V.42bis functions locally on segments 1 and 3, as opposed to having this done end-to-end by the client C machine and server S machine modems. Once this was accomplished, the demodulated/decompressed data could be conveyed using a reliable transport between the peer VoIP gateways. However, performing the V.42bis de/compression on the VoIP gateways is not a good approach for two reasons. First, de/compression is a high CPU usage operation that can have a significant adverse impact on a gateway's performance (consider that many such calls may be carried on a given VoIP gateway). Second, carrying decompressed data on the VoIP network requires more bandwidth (up to several times as much), compared to carrying compressed demodulated data, and thus does not represent optimal utilization of the IP network.

If, on the other hand, it were possible to maintain the V.42bis modem entities (endpoints) in synchronization, then the client C machine and server S machine modems themselves—which typically have V.42bis functionality—would be able to perform the needed de/compression function. Those of skill in the art will appreciate that the V.42bis de/compression operates on bits/bytes of data and requires synchronization of the transmit and receive ends to be able to perform the de/compression function. This means bits transmitted by the V.42bis transmit entity (e.g. the client machine C modem) all need to be delivered in sequence to the receiving modem (e.g. the server machine S modem, in this example).

Thus, the invention involves a method for establishing and maintaining the required synchronization between the V.42bis entities at the end-points (i.e. the client machine C and the server machine S modems). By use of the invention, the gateways are offloaded and are not required to perform the de/compression function for V.34/V.42/V.42bis modem relay. In accordance with the invention, the gateways terminate the V.34 physical layer, preferably in accordance with the teachings of our co-pending U.S. patent application Ser. No. 09/215,438, referenced above, or within the spirit and scope of the invention by any other suitable means. Also in accordance with the invention, the gateways terminate also the V.42 error correcting data link layer, using any suitable method such as that suggested by the teachings of our same co-pending patent application. For example the error, correction that is normally handled by the data link layer in the modem communications would be now handled between the gateways, rather than the modems. Importantly, the gateways do not terminate the V.42bis functionality, but instead that function is performed by the end-point modems themselves.

Figure 3:
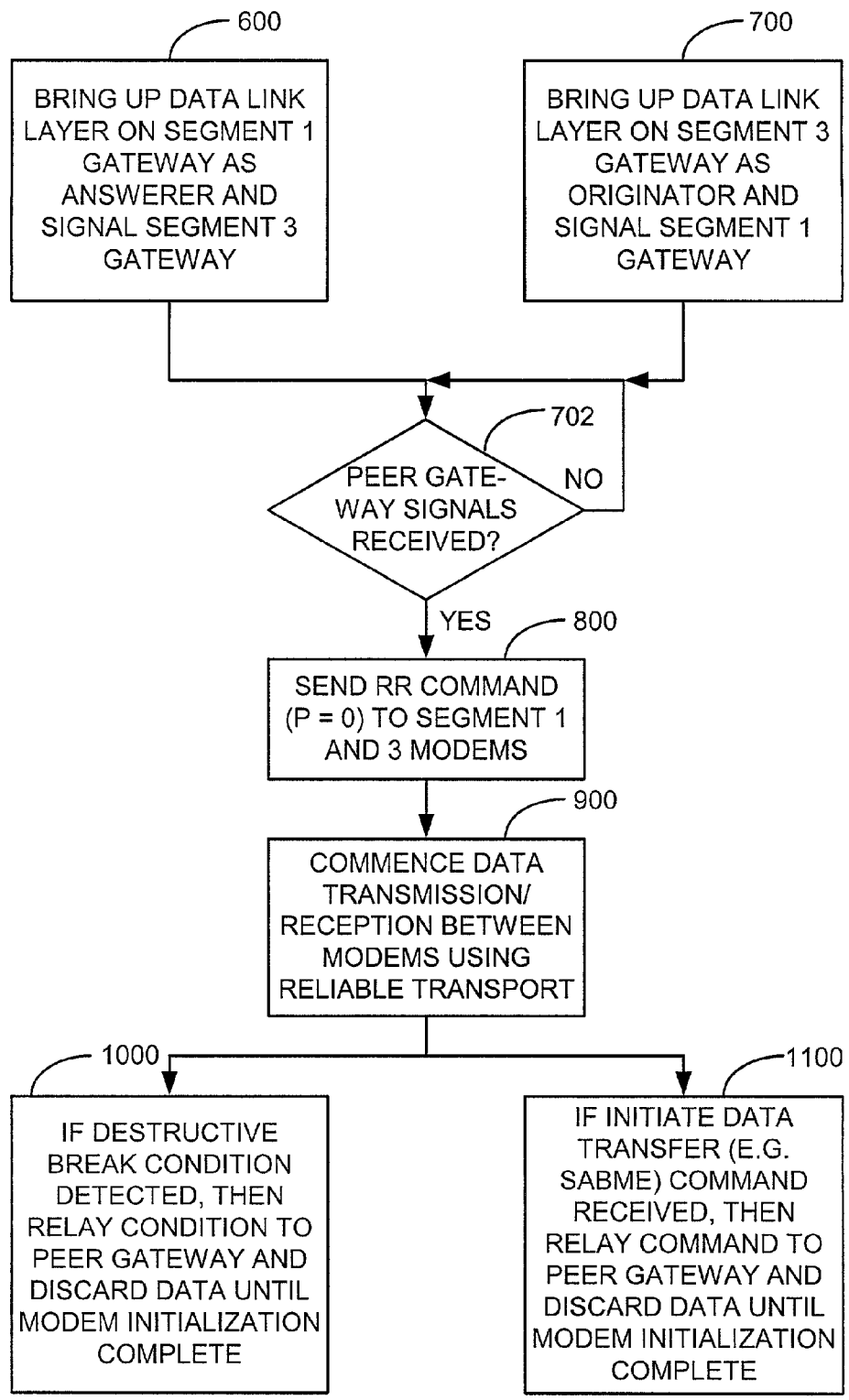
FIG. 3 is a flowchart of the de/compression synchronization method in accordance with a preferred embodiment of the invention.

FIG. 3 illustrates the preferred method of the invention by which end-to-end high-speed dial-up modem de/compression is synchronized and maintained in synchronization.

First, assume the client C machine and server S machine modems are V.34/V.42/V.42bis type and functionality and that a call is initiated from the client C machine to the server S machine modem. The preferred method in accordance with the invention continues in six numbered steps as follows, following the negotiation at step 5 (block 500 in FIG. 2) of the local physical layer.

6) The gateway on segment 1 acts like the answerer modem and responds to the originating modem (i.e. the client machine C modem) and brings up the error-correcting data link (V.42) layer on segment 1. The gateway would respond back to any client machine C modem V.42 poll command (i.e. P=1) with a V.42 Receiver Not Ready (RNR) message with N(R)=0, until it receives an indication from the peer (remote) gateway that segment 3 is up (see step 7, below). This maintains the telephony line on segment 1. (Otherwise, the client machine C modem would hang up after a timeout period during which there is no active communication.)

This step 6 is illustrated in FIG. 3 at 600.

7) The gateway on segment 3 acts as the originator modem and brings up the error-correcting data link (V.42) layer on segment 3. The gateway would respond back to any server machine S modem V.42 poll command (i.e. P=1) with a V.42 RNR message with N(R)=0, until it receives an indication from the peer gateway that segment 1 is up (see step 6, above). This maintains the telephone line on segment 1. (Otherwise, the server machine S modem would hang up after a timeout period during which there is no active communication.)

This step 7 is illustrated in FIG. 3 at 700.

Those of skill in the art will appreciate that bringing up segments 1 and 3 in accordance with the invention may take several seconds (as it requires a retrain operation on the modem line). This means step 6 may end before or after step 7, depending on the circumstances such as the number and length of any retrains. The purpose of sending RNR with N(R)=0 is to maintain the line while the corresponding activity on the remote segment is still in progress and, meanwhile, to acknowledge no packets from the local modem. As soon as each gateway has completed bringing up its own local segment and has received an indication from its peer gateway that the remote segment is up, then the method proceeds with step 8, below.

In accordance with the preferred method of the invention, (a) a gateway brings up its local end; b) sends a message to the peer gateway that (a) is complete; (c) checks its receive queue to determine whether the peer gateway has already notified it of (b) on the peer side; and, if necessary, (d) continues to poll the queue until such notification is received. The message received as part of (c) above preferably is sent by the peer gateway using a reliable transport having its own acknowledgement scheme. Accordingly, higher level code, e.g. modem relay code, need not generate an acknowledgement to such a message. This is because in accordance with the preferred method of the invention, it is assumed that, since the transport is reliable, such a message could not have been lost.

Preferably, the determination that steps 6 and 7 have been completed is accomplished as follows. Each gateway maintains a flag indicating whether it has signaled the other that the local segment is up. Further, each gateway polls its own receive queue to determine whether it has received a signal from the remote gateway that the remote gateway's segment is up. When both conditions are met, steps 6 and 7 have both been completed. Those of skill in the art will appreciate that such signaling may be performed by any suitable method, within the spirit and scope of the invention, including the preferred and conventional out-of-band signaling. It will be appreciated that use of a reliable transport for such signaling virtually guarantees receipt at the remote gateway of the local gateway's signal. Nevertheless, each gateway may further await an acknowledgement from the remote gateway of its own signal to confirm that the remote gateway has received its indication that the local segment is up.

8) At the completion of steps 6 and 7, above, the V.42bix entities on the client C machine and server S machine modems are in synchronization, as no data transfer has yet occurred. At this time, the two gateways proceed by sending an RR command with P=0 to their associated modems. This indicates each gateway's readiness to accept incoming data from the modems.

Step 8 is illustrated in FIG. 3 at 800.

9) Either modem may now proceed to transmit data to its corresponding gateway. All data received from each modem must be transferred to the peer (remote) gateway using a reliable transport, e.g. Transmission Control Protocol (TCP), Real-Time User Datagram Protocol (RUDP), etc. A reliable transport between the peer gateways is required. This is because the V.42 data has been acknowledged by the gateway, and it is now the responsibility of the VoIP network reliably to deliver to the remote end any dropped packets that would, if not received, destroy synchronization between the V.42bis entities. Those of skill in the art will appreciate that such data transmissions are characterized by synchronized compression and decompression (de/compression), performed by the endpoint modems.

Step 9 is illustrated in FIG. 3 at 900.

Those of skill in the art will appreciate that initial synchronization between the two connected modems has been accomplished by steps 6 through 9, above. It will also be appreciated that subsequent loss of synchronization is possible, e.g. via the occurrence of any V.42 Destructive Breaks on segment 1 or segment 3. To maintain synchronization after such a Destructive Break on either segment 1 or segment 3 during the data transfer phase, the method further preferably involves step 10, below.

If a V.42 Destructive Break occurs on segment 1 during the data transfer phase, the V.42bis entity on the client machine C modem would be initialized. Accordingly, to maintain synchronization of the V.42bis entity in segment 1, the Destructive Break is relayed to segment 3 to initialize the V.42bis entity on the server machine S modem. Similarly, if a Destructive Break is detected on segment 3, the Destructive Break is relayed to segment 1. Any data in transit across the network before the destructive break condition occurred on either segment is discarded until the Destructive Break has been comprehended (i.e. processed) by both segments. The discarding of data in a VoIP network preferably is accomplished by always labeling data with a Session ID (before transmitting it to the peer VoIP gateway on the IP network). The Session ID is incremented when a Destructive Break is received by a VoIP gateway. The VoIP gateway notifies its peer gateway with the new Session ID when session ID changes occur. Thus, each gateway is programmed to throw away data from an 'old' session, i.e. a session having a lower ID.

Step 10 is illustrated in FIG. 3 at 1000.

One other potential loss of synchronization is accommodated by the invented method in its preferred embodiment. A Set Asynchronous Balanced Mode Extended (SABME) command may be used by either client machine C or server machine S to initiate data transfers in accordance with the V.42 protocol. Upon detection of such a SABME command, a similar procedure to that described in detail in step 10, above, preferably is used to re-establish, and thus to maintain, synchronization. In other words, the SABME command is relayed to the remote gateway so that synchronization is maintained. Alternatively, of course, the call may be terminated and re-placed, if desired.

Step 11 is illustrated in FIG. 3 at 1100.

Referring again now to FIG. 1, apparatus 8 will be described in more detail. Apparatus 8 may be seen to include a modem relay connection mechanism and a de/compression synchronizer. The modem relay connection mechanism includes an ANSam tone detector 20; a pass-through (pass-thru) mode invocation mechanism 22; and preferably also a remote-gateway (remote-GW) signaling mechanism 24. The modem relay connection mechanism also includes a CM code detector 26; a signal suppression mechanism 28; and a local proxy negotiation mechanism 30. As will be understood from the above description of the invented method, ANSam detector 20 causes pass-through mode invocation mechanism 22 to disable voice compression and echo cancellation if either or both are determined to have been enabled. ANSam detector 20 also causes remote-GW signaling mechanism 24 to signal the remote gateway 18 connected to the far-end modem. Those of skill in the art will appreciate that it is not yet determined to a high degree of certainty that both modems are high-speed.

Upon detection of a CM code by code detector 26, the transition to modem relay mode may begin, since detection of a CM code by either gateway 18 indicates that a high-speed modem 16' has received an ANSam from another high-speed modem 16' in accordance with the V.34 protocol. Thus, CM code detector 26 causes a signal suppression mechanism 28 immediately to suppress further signals between high-speed modems 16', effectively terminating the end-to-end physical layer negotiations therebetween. Once signals have been suppressed—at what is referred to herein as a predeterminedly early time in the end-to-end negotiations—local proxy negotiation mechanism 30 transmits or detects consecutive identical CM codes, as described above, and then completes local physical layer negotiation in accordance with the high-speed, dial-up V.34 modem protocol.

Those of skill in the art will appreciate that negotiation mechanism 30, in accordance with the present invention, brings up both the physical layer and the data link layer of gateway 18. In other words, negotiation mechanism 30 accomplishes steps 5, 6 and 7 described above by reference to blocks 500, 600, 700 of FIGS. 2 and 3.

Referring still to FIG. 1, de/compression synchronizer 32 preferably includes a negotiation mechanism 30, a signaling mechanism 34, a command mechanism 36, a commencement mechanism 38, a detection mechanism 40, a relaying mechanism 42 and a data discard mechanism 44. Negotiation mechanism 30 brings up the physical and data link layers on a segment, e.g. segment 1, associated with a first one of two endpoint modems and an associated gateway, as answerer. Negotiation mechanism 30 also brings up the physical and data link layers on another segment, e.g. segment 3, associated with a second one of the two endpoint modems, as originator. Signaling mechanism 34 associated with each gateway 18, responsive to negotiation mechanism 30, signals the other gateway and awaits a signal therefrom. Command mechanism 36 sends a receiver ready (RR) command to the two endpoint modems. Commencement mechanism 38, responsive to command mechanism 36, commences data transmission/reception between the two endpoint modems.

Detection mechanism 40 detects a destructive break condition or receipt of an initiate data transfer command. Responsive to such detection, relaying mechanism 42 associated with each gateway 18 relays the destructive break condition to the other gateway upon detection of the same and relays the receipt of the initiate data transfer command upon detection of the same. It will be appreciated that such relaying is from a segment where the destructive break condition or the receipt of the initiate data transfer command is detected to the other segment. Finally, data discard mechanism 44, responsive to relaying mechanism 42, discards data until a modem initialization responsive to the condition and/or the command receipt is completed.

Importantly, negotiation mechanism 30, during negotiations of the physical and data link layers, sends from either gateway to an associated modem in response to any poll command therefrom, a not-ready message. As described above, this maintains the telephony line on segments 1 and 3 and avoids a hang-up by the associated modem that otherwise would occur because of inactivity.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of transmitting modem relay data across a network, comprising:
    detecting a call request;
    determining that the call request is between a local high-speed modem and a remote high-speed modem;
    suppressing modem signals from the local modem;
    negotiating physical layer parameters with an ITU-T V.42bis entity on the local modem;
    transmitting a ready signal to the local modem when negotiation is complete;
    synchronously exchanging data between the V.42bis entity on the local modem and a V.42bis entity on the remote modem;
    detecting a loss of synchronization; and
    performing a resynchronization by:
        relaying a destructive break condition to the remote gateway;
        discarding any data in transit prior to the destructive break; and
        resynchronizing communications between the V.42bis entities on the local and remote modems.

2. The method of claim 1, detecting a call request further comprising detecting a call request from the local high-speed modem.

3. The method of claim 1, detecting a call request further comprising detecting a call request from a remote gateway in communication with a high-speed modem.

4. The method of claim 1, detecting a call request further comprising detecting an ITU-T V.8 ANSam signal.

5. The method of claim 1, synchronously exchanging data further comprising performing compression and decompression of data with the V.42bis entities on the remote and local modems.

6. The method of claim 1, further comprising transmitting not-ready signals to the local modem until a ready signal is received from the remote gateway.

7. The method of claim 1, detecting a loss of synchronization further comprising detecting a SABME command from the remote modem and resynchronizing the V.42bis entities on the local and remote modems in accordance with ITU-T V.42.

8. A network device, comprising:
   a detector to allow the device to detect a call request between a local high-speed modem and a remote high-speed modem;
   a suppression mechanism to suppress modem signals from the local modem;
   a negotiation mechanism to negotiate physical layer parameters with the local high-speed modem;
   a signaling mechanism to transmit a ready signal to the local modem when negotiation is complete;
   a pass-through mechanism to exchange data between V.42bis entities on the local modem and the remote modem such that the V.42bis entities handle compression and decompression of data
   a detection mechanism for detecting a loss of synchronization; and
   a relaying mechanism to relay a loss of synchronization due to a destructive break.

9. The network device of claim 8, the relaying mechanism further comprising a relaying mechanism to relay a SABME message.

10. An article of computer-readable media containing code that, when executed, causes the computer to:
    detect a call request;
    determine that the call request is between a local high-speed modem and a remote high-speed modem;
    suppress modem signals from the local modem;
    negotiate physical layer parameters with an ITU-T V.42bis entity on the local modem;
    transmit a ready signal to the local modem when negotiation is complete;
    synchronously exchange data between the V.42bis entity on the local modem and a V.42bis entity on the remote modem;
    detect a loss of synchronization; and
    perform a resynchronization by:
       relaying a destructive break condition to the remote gateway;
       discarding any data in transit prior to the destructive break; and
    resynchronizing communications between the V.42bis entities on the local and remote modems.

11. A network device, comprising:
    means for allowing the device to detect a call request between a local high-speed modem and a remote high-speed modem;
    means for suppressing modem signals from the local modem;
    means for negotiating physical layer parameters with the local high-speed modem;
    means for transmitting a ready signal to the local modem when negotiation is complete;
    means for exchanging data between V.42bis entities on the local modem and the remote modem such that the V.42bis entities handle compression and decompression of data;
    means for detecting a loss of synchronization; and
    means for relaying a loss of synchronization due to a destructive break.

* * * * *